United States Patent [19]
Witte

[11] Patent Number: 4,575,243
[45] Date of Patent: Mar. 11, 1986

[54] MONOCHROMATOR

[75] Inventor: Wolfgang Witte, Uberlingen, Fed. Rep. of Germany

[73] Assignee: Bodenseewerk Perkin-Elmer & Co., GmbH, Uberlingen, Fed. Rep. of Germany

[21] Appl. No.: 502,990

[22] Filed: Jun. 10, 1983

[30] Foreign Application Priority Data

Jul. 1, 1982 [DE] Fed. Rep. of Germany ....... 3224559

[51] Int. Cl.$^4$ .............................................. G01J 3/18
[52] U.S. Cl. .................................... 356/333; 356/308
[58] Field of Search ................ 356/308, 332, 333, 334

[56] References Cited

U.S. PATENT DOCUMENTS

| 3,865,490 | 2/1975 | Grossman | 356/333 |
| 4,235,518 | 11/1980 | Greiner | 372/102 |

FOREIGN PATENT DOCUMENTS

| 124164 | 1/1959 | U.S.S.R. | 356/308 |
| 130215 | 3/1960 | U.S.S.R. | 356/333 |
| 600401 | 3/1978 | U.S.S.R. | 356/333 |
| 832353 | 5/1981 | U.S.S.R. | 356/333 |

OTHER PUBLICATIONS

Olson, *The Reviews of Scientific Instruments*, vol. 31, No. 8, Aug. 1960, pp. 844–849.
White, *Conference: Proceedings of the Seminar on Remote Sensing of Earth Resources and Environment*, Palo Alto, California, Nov. 1971, pp. 111–114.

*Primary Examiner*—F. L. Evans
*Attorney, Agent, or Firm*—F. L. Masselle; E. T. Grimes

[57] ABSTRACT

A monochromator comprises a first and a second concave grating. An entrance slit is imaged by the concave grating in the plane as a spectrum. A disc comprises a spiral slot. A section of the slot forms an intermediate slit periodically sweeping transversely across the spectrum. A concave mirror images the fanning point of the concave grating. Thereby the fanned beams are recombined to a single beam. An exit slit is located in an image plane in which an image of the entrance slit is generated. The spectrum can be scanned quickly and cyclically without the gratings having to be rotated. There is also the effect of a double monochromator. Another embodiment comprises two concave mirrors to generate the image.

8 Claims, 5 Drawing Figures

MONOCHROMATOR

BACKGROUND OF THE INVENTION

The present invention generally relates to a variable wavelength monochromator and, in particular, relates to such a monochromator including a transversely movable slit to vary the wavelength, which slit is positioned in the path of rays of two dispersive elements.

In a conventional monochromator, a light beam to be spectrally dispersed is directed upon an entrance slit. The light beam is directed from that entrance slit to a dispersive element, for example a grating or a prism. The dispersive element spreads, or fans, the incident radiation as a function of the wavelength. The radiation is thus directed in different directions as a function of the wavelength. An image of the entrance slit is generated by the imaging optical means by means of the spectrally fanned light beam. This image of the entrance slit is correspondingly spectrally dispersed and forms a spectrum. A stationary exit slit is arranged in the plane of this spectrum through which exit slit radiation of a certain wavelength emerges from the monochromator.

Ordinarily, to vary the wavelength of the emerging radiation the dispersive optical element is rotated. This optical element may be, for example, a Littrow-mirror in a prism monochromator or the grating in a grating monochromator. To obtain a linear wavelength, or wavenumber, graduation the rotation has to be carried out in accordance with a determined function of the desired wavelength. In a grating spectrometer, for example, the rotation is carried out in accordance with a sine function. Such non-linear drives are complex and expensive.

If, in addition, a spectral range is to be scanned several times it becomes necessary to return the rotatable optical element to its initial position. The time between scans, i.e., the frequency of such a periodic scanning of the wavelength range, is greatly limited thereby.

In addition to the desired radiation, radiation of undesired wavelengths (stray light) also emerges through the exit slit. One conventional device employed to reduce this stray light component is a double monochromator. Such double monochromators usually comprise a first dispersive element onto which the light is directed from the entrance slit. The first dispersive element and related imaging optical means generate a spectrum in the plane of an intermediate slit. This intermediate slit only transmits light of a certain selected wavelength which is, however, superimposed by a certain stray light component. The intermediate slit represents the entrance slit for a second monochromator having a second dispersive element. The light, which is again fanned by the second dispersive element, is collected as a spectrum in the plane of an exit slit. The exit slit transmits from this spectrum light of the same wavelength as that transmitted by the intermediate slit. Again, stray light may develop by scattering and deficiencies in the components. However, as substantially only light of the desired wavelength initially passes through the intermediate slit out of the pre-monochromator into the main monochromator, the final content of stray light represents only a small proportion of an already small incident proportion. The wavelengths of a double monochromator are set by displacing optical components, in this case components of both pre- and main monochromators have to be displaced synchronously with the desired wavelength.

SUMMARY OF THE INVENTION

Accordingly, it is one object of the present invention to provide a monochromator with variable wavelength capability, but in which the dispersive elements are casing-fixed.

In particular, such a monochromator permits rapid periodic scanning of a spectrum. The stray light is suppressed as in a double monochromator without requiring optical components which are displaced synchronously in pre- and main monochromators.

According to the invention, this object is achieved, at least in part, in that the fanning point of the first dispersive element is imaged by a second imaging optical means in the fanning point of the second dispersive element, the intermediate slit is transversely movable to vary the wavelengths, and the second dispersive element is arranged such that it essentially recombines the beams which are fanned by the first dispersive element and which are directed onto the fanning point by the second optical means to one single beam.

While in a double monochromator the main monochromator spectrally disperses the light of the pre-monochromator, in the present invention the path of rays spectrally fanned by the first dispersive element is recombined to a uniform light beam. The spectrum is scanned by the intermediate slit transversely movable in the plane of the real spectrally dispersed image of the entrance slit. In contrast to a transversely movable exit slit in a conventional monochromator the geometry of the light beam emerging from the monochromator is not affected by the transverse motion of the intermediate slit. Since the exit slit is imaged onto a detector by an imaging optical system, it would be difficult to move it across the generated spectrum in a conventional monochromator to scan the wavelengths.

Other objects and advantages will become apparent to those skilled in the art from the following detailed description read in conjunction with the attached drawing and the claims appended hereto.

BRIEF DESCRIPTION OF THE DRAWING

Representative embodiments, embodying the principles of the present invention, are described hereinafter in greater detail with reference to the accompanying drawing, which is not drawn to scale, and wherein.

DETAILED DESCRIPTION OF THE INVENTION

Figure 1:
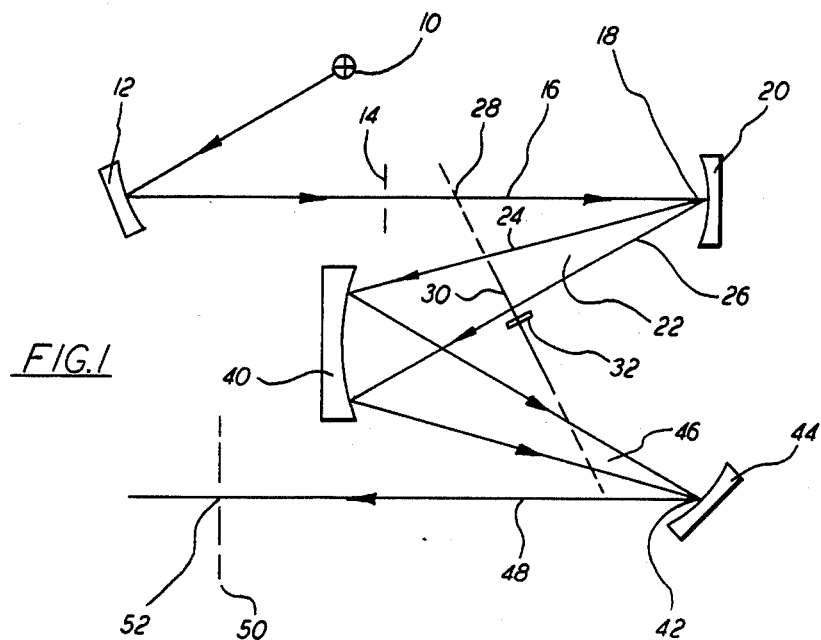
FIG. 1 is a schematic illustration of the optical path of light rays of a monochromator, which path is illustrated by the ray axes.

A light source, generally designated by numeral 10 in FIG. 1, is imaged, for example, by means of a concave mirror 12, in the plane of an entrance slit 14. The axial ray 16 of the light beam impinges at a point 18, on a first dispersive element 20, shown in this embodiment as a concave grating. Dispersive element 20 fans, or disperses, the beam as a function of its wavelength content and thus generates a fan of rays 22, the marginal rays of which are designated at 24 and 26. The first dispersive element 20 creates a real spectrally dispersed image of the entrance slit 14 in a plane 28. A rotatable disc 30 is positioned in this plane 28.

Figure 2:
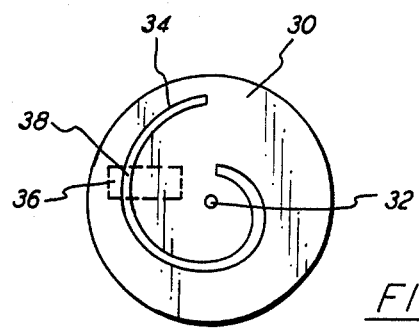
FIG. 2 illustrates a disc having a spiral slot which can be utilized in the monochromator of FIG. 1.

One preferred embodiment of the disc 30 is illustrated in FIG. 2. The disc 30 is arranged to rotate about its axis 32 and includes a spiral slot 34 therethrough. A section of this slot 34 is arranged to extend through the dispersed spectrum 36 created in the plane 28 and thereby form an intermediate slit 38.

The point 18 represents the fanning point of the dispersive element 20 located on the optical axis, at which fanning point an incident beam is fanned, or dispersed, into a beam. For example, rays 24 and 26, emerge at different angles from the point 18, which angles are dependent upon their respective wavelengths. A concave mirror 40 images the fanning point 18 at the fanning point 42 of a second dispersive element 44, shown, in this embodiment, as a concave grating. The fan of rays 46 converges to the fanning point 42 and is combined by the second dispersive element 44 into a single ray 48. The concave mirror 40 and the concave grating, i.e., the second dispersive element 44, image the image plane 28 in a plane 50 whereat an exit slit 52 is located.

Alternatively, the entrance slit 14 could be replaced by a sufficiently spectrally narrow light source. In this instance, the aforementioned light source itself would functionally operate, or serve, as the "entrance slit".

In the preferred embodiment, the disc 30 is operated so as to rotate in a clockwise direction (as viewed in FIG. 2) at a constant rotary speed. The section of the spiral slot 34 serving as an intermediate slit 38 then moves across the stationary spectrum 36 from the left to right (in FIG. 2) and then jumps back to the left, whereby the spectrum is respectively scanned in rapid sequence to the right in FIG. 2. Configuration of the spiral slot 34 is preferably such that, with each equal angle of rotation, increments of the disc 30, i.e., the intermediate slit 38, are displaced relative to the spectrally dispersed image 36 of the entrance slit 14 by distances corresponding to equal wavelength increments. The width of the spiral slot 34 varies so that a substantially constant width of spectral slit 38 is maintained over the entire scanned wavelength range. In this way, the spectrum is linearly scanned in time with a constant spectral width. The scanning can, of course, be carried out in such a manner that the wavenumber, rather than the wavelength, varies linearly in time.

The section of the slot 34 forming the intermediate slit 38 is slightly curved and the radius of curvature of the spiral decreases towards the center of the disc 30. The slit curvature in the spectrum increases from the left to the right, the slit being convexly curved to the left. This corresponds at least qualitatively to the shape of the slit images. As is known, a grating provides curved slit images, the curvature increasing with the wavelength, and the convex side being directed towards the shortwave end of the spectrum. If the spectrum 36 has the shorter wavelengths on the left and the longer wavelengths on the right then the slit images are convexly curved to the left and its curvature increases to the right. The curvature of the slit image is produced with a straight entrance slit. This curvature of the slit image can be varied by a slight curvature of the entrance slit towards one or the other direction. Thus, an optimal matching of the slit curvatures with the curvatures of the sections of the spiral slot 34, which sections are functionally the intermediate slit 38, can be achieved. The curvatures due to the first dispersive element 20 are, at least partially compensated for by the grating constituting second dispersive element 44 so that a straight slit image is developed which is substantially independent of wavelength. The monochromator described also effectively functions as a double mono-chromator and thus has correspondingly low stray light. Consequently, all of the desired characteristics of a double monochromator are maintained, that is, an entrance slit 14, a first dispersive element 20, an intermediate slit 38, a second dispersive element 44 and an exit slit 52. The resultant reduction of stray light can be explained as with any double monochromator.

Due to perturbations, (dust, irregularities or the like associated with the surface) on the first dispersive element 20, not only radiation of the set wavelength pass through the intermediate slit 38 but also a small proportion of radiation of other wavelengths, i.e., stray light, passes therethrough. The radiation then encounters the second dispersive element 44. The second dispersive element 44 directs the radiation of the desired wavelength to the exit slit 52 and also directs a proportion of other wavelengths adjacent the slit opening of the exit slit 52. Thus, as in a double monochromator, only a small proportion of the stray light which initially passed through the intermediate slit 38 reaches the exit slit 52. That is, the proportion which is secondarily scattered along the optical axis by the scattering centers of the second dispersive element 44, i.e., the resultant residual stray light, is a small proportion of an initially small proportion.

The dispersive elements 20 and 44 can alternatively be formed by prisms with, for example, a Littrow-mirror. In gratings the fanning points 18 and 42 are real image points. In prisms, however, the fanning points are virtual image points. The width of the spiral slot 34 can also be selected so that, instead of a constant spectral slit width, a constant signal is obtained at the detector; in other words so that the product of the radiation flux and detector sensitivity becomes a constant. Such an arrangement is preferable for detectors having a small dynamic range.

A monochromator of the type described may be implemented with prisms as dispersive elements and may serve as a pre-monochromator of a conventional grating mono-chromator. Its main function is then to suppress undesired grating orders.

Compared to the use of filters as known in the art, such a pre-monochromator offers the advantage that the problems associated with the use of filters, as, for example, steps in the hundred percent line or steps due to stray light at high sample extinction, are avoided. In comparison to a conventional prism pre-monochromator, there is also the advantage that no optical components, such as a Littrow-mirror, have to be rotated.

In the embodiment as a grating monochromator there is the advantage, as compared to a conventional grating monochromator, that the wavelength range can be periodically scanned very quickly. Such a grating monochromator is thus quite useful as in a detector for liquid chromatography.

If filters, which are required to suppress undesired grating orders, are placed directly on the disc 30, steps are avoided in the recording when the filter is changed.

The borderline, or transition, between two filters is preferably displaced across the section acting as an intermediate slit such that a continuous transition between filters is easily achieved.

Figure 3:
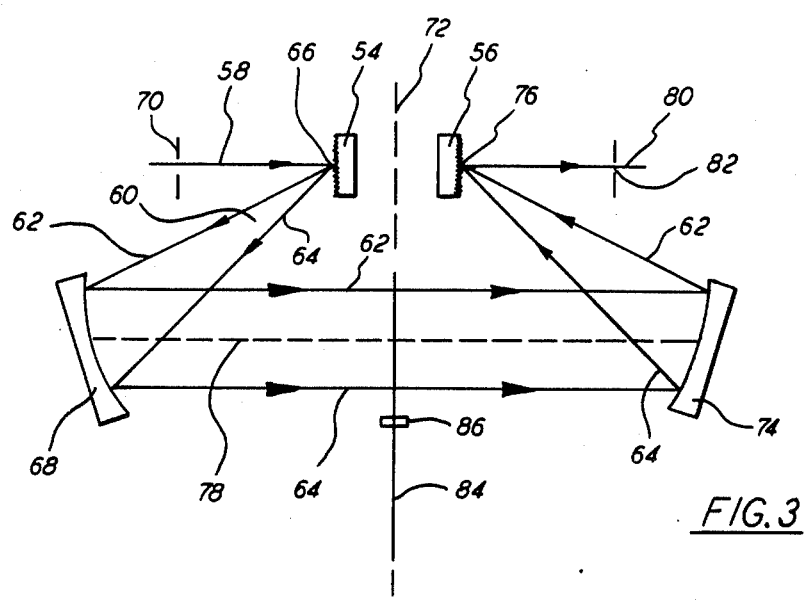
FIG. 3 shows the optical path of light rays of the monochromator of another embodiment.

In the embodiment of FIG. 3, a first dispersive element 54, shown in the form of a plane grating, and a second dispersive element 56, in the form of a plane grating, is also provided. The two dispersive elements are coaxially arranged with their backs in parallel confrontation. The first dispersive element 54 then fans an incident light beam 58 as a function of wavelength into a fan 60 of spectrally dispersed beam, the extreme rays thereof being illustrated at 62 and 64. The fanning is effected at a fanning point 66 located on the optical axis. First imaging optical means 68, shown in the form of a concave mirror, creates a real image of the entrance slit 70 in a plane 72, which, in this embodiment is substantially the center plane of the arrangement, as illustrated in FIG. 3. Simultaneously, the concave mirror 68 images the fanning point at infinity. Consequently, the segment of rays 62 and 64 between mirrors 68 and 74 are, for all intents and purposes, parallel.

A second concave mirror 74 directs the substantially parallel rays, 62 and 64, onto the fanning point 76 of a second dispersive element 56. Therefore, as the axial rays of the beams 62 and 64 show, the fanning point 66 of the first dispersive element 54 is imaged by the two concave mirrors 68 and 74 onto the fanning point 76 of the second dispersive element 56. The two concave mirrors, 68 and 74 together form the "second imaging optical means".

The second dispersive element 56 is located with respect to the concave mirror 74 as the first dispersive element 54 is located with respect to the concave mirror 68. It is to be noted that the ray 62 emerges at a smaller angle to the grating normal of the dispersive element 54 than the ray 64 and by the double reflection by the concave mirrors 68 and 74 the ray 64 correspondingly impinges on the dispersive element 56 at a smaller angle to the grating normal than the axial ray 64. This arrangement is symmetrical. The two gratings forming the dispersive elements 54 and 56 are symmetric and parallel to a center plane 72. The two concave mirrors 68 and 74 are arranged facing each other symmetric to this center plane 72. The two concave mirrors 68 and 74 facing each other are inclined in opposite directions to a straight line 78 connecting the apex of the concave mirrors 68 and 74.

The optical axis of the concave mirror 68 is rotated counter-clockwise relative to the straight line 78 and the optical axis of the concave mirror 74 is rotated clockwise relative thereto. The straight line 78 is perpendicular to the center plane 72. The spectrally fanned light rays 62, 64 between the concave mirrors are parallel to the straight line 78. The real spectrally dispersed image of the entrance slit 70 is effectively located, as previously mentioned, in the center plane 72. Thus, the rays, 62 and 64, fanned by the first dispersive element 54 and directed by the second optical means 68 and 74 onto the fanning point 76 of the second dispersive element 56, are recombined into a single beam 80.

In the path of the beam 80, which is generated by the second dispersive element 56 by recombination of the fanned beams, 62 and 64, a further image of the entrance slit 70 is created by the concave mirror 76 symmetric to the entrance slit 70 with respect to the center plane 72. An exit slit 82 is positioned in the plane of this further image.

In the center plane 72 a disc 84 is adapted to rotate about an axis 86. The disc 84 is also provided with a spiral slit. The form of the disc 84 and its arrangement relative to the image of the entrance slit 70, which image is generated in the center plane 72 and is spectrally dispersed, is similar to the disk 30 described in the previous embodiment and shown in FIG. 2. As previously described, an intermediate slit is effectively defined, by a section of the spiral slot, periodically swept across the spectrally dispersed image of the entrance slit 70.

In such an embodiment, filters can be readily provided to eliminate undesired grating orders. These filters can be mounted on the rotating disc 84 as previously described. A particularly advantageous arrangeent is, however, illustrated in FIG. 5.

Figure 5:
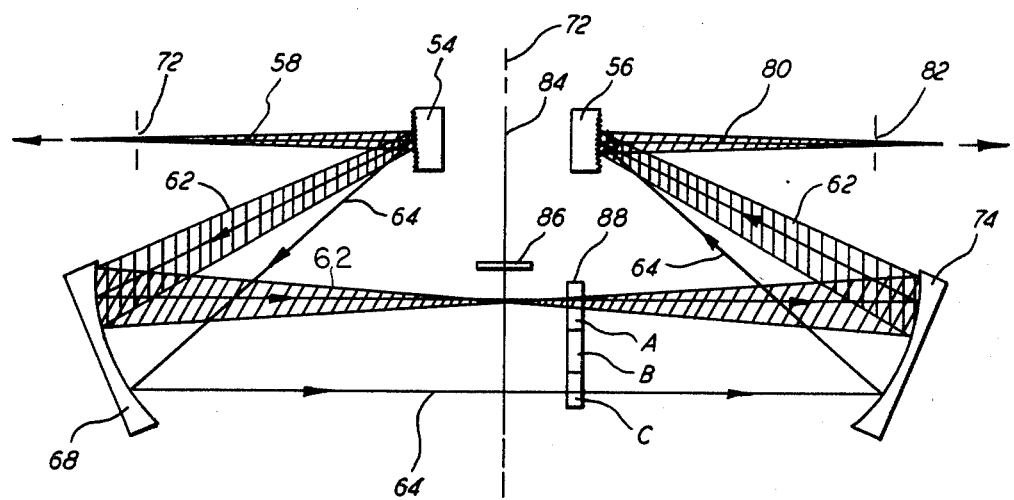
FIG. 5 shows the optical path of light rays of a monochromator similar to FIG. 3 and including an arrangement of filters for suppressing in higher orders.

FIG. 5 substantially corresponds to FIG. 3. However, not just the marginal rays 62, 64, but the entire beam is shown for better illustration of the image formation. In the embodiment of FIG. 5, stationary filters 88, designated by A, B and C, are positioned in the spectrally fanned path of rays 62 and 64. These filters 88 suppress undesired grating orders. Stationary filters 88, instead of an otherwise conventional filter wheel, can be used, because in contrast to conventional monochromators, the scanned spectrum is stationary in the center plane 72.

The filters 88 can, of course, be arranged in the center plane 72. Advantageously, the filters 88 are arranged as illustrated in FIG. 5 in the proximity of, but at a distance from, the surface, that is the center plane 72, in which the first imaging optical means creates the real spectrally-dispersed image of the entrance slit 70. By this arrangement, the transition from one filter to the next is more continuous when the entire spectrum is scanned.

Figure 4:
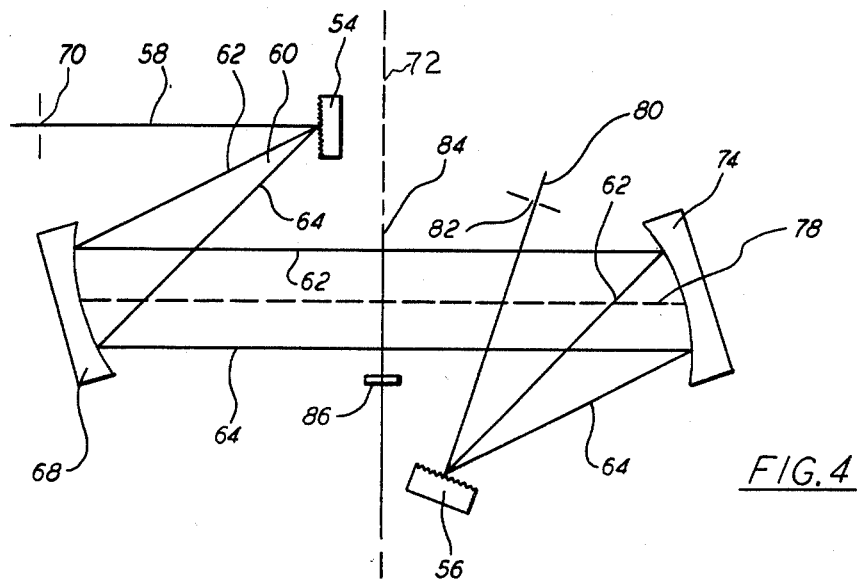
FIG. 4 depicts the optical path of light rays of the monochromator of still another embodiment.

The embodiment of FIG. 4 is, in principle, similar to the embodiment shown in FIG. 3. Corresponding elements are designated by the same reference numerals. On the left of the center plane 72, the arrangement of FIG. 4 completely corresponds to the one of FIG. 3. Therein, a spectrum is generated as spectrally dispersed image of the entrance slit 70 substantially in the center plane 72 and is scanned by the disc 84 with the spiral slot. As in FIG. 3, the second dispersive element 56 is arranged with respect to the second concave mirror 74 in the same way as the first dispersive element 54 is arranged with respect to the first concave mirror 68. However, in the embodiment shown in FIG. 4, the concave mirrors 68 and 74 which face each other are inclined in the same direction with respect to the straight line 78, i.e., the optical axis of the concave mirror 74 is rotated counterclockwise relative to the straight line 78.

This arrangement is slightly more advantageous optically because it compensates for image errors, for example, by an inclination of the image plane of the entrance slit 70 at the exit slit 82.

Instead of being formed as plane gratings the dispersive elements 54 and 56 can alternatively be formed as concave gratings as in the embodiments of FIGS. 3 and 4. The two concave mirrors 68 and 74 would then have different focal lengths.

Although specific embodiments have been described herein such embodiments are for exemplary purposes and not limiting since other arrangements and configurations can be made without departing from the spirit of the present invention. Consequently, the present inven-

What is claimed is:

1. A grating monochromator for scanning a spectrum comprising, in combination:
    an entrance slit
    an entering light beam disposed to pass through said entrance slit and for defining a first optical axis;
    a first stationary grating means for dispersing said light beam, after passing through said entrance slit, into dispersed beams having axes in accordance with wavelength about a fanning point on said optical axis;
    a first concave mirror arranged to receive said dispersed beams and to image said fanning point at infinity and to focus said dispersed beams to form intermediate images of said entrance slit in a plane, said intermediate images forming a spectrum;
    a second stationary grating for defining a second optical axis and fanning point on said second optical axis;
    an exit slit disposed along said second optical axis;
    a second concave mirror arranged on the side of said plane opposite said first concave mirror, said second concave mirror being disposed to receive said dispersed beams and redirect them onto said second grating and to image said intermediate image on said exit slit;
    a rotatable disc having a spiral slot therein, said disc being disposed in said plane and said slot being arranged to define an intermediate slit in the area of said intermediate images and, in operation on rotation of said disc, said spectrum is scanned; and
    stationary filter means arranged in the path of said dispersed beams to supress undesired grating orders.

2. The grating monochromator of claim 1 wherein said spiral slot is formed such that with equal angle of rotation increments of said disc said intermediate slit is displaced relative to the spectrally dispersed image of said entrance slit by distances corresponding to equal wavelength increments.

3. The grating monochromator of claim 1 wherein the width of said spiral slot varies such that a substantially constant spectral slit width is achieved over the whole scanned wavelength range.

4. The grating monochromator of claim 2 wherein the width of said spiral slot varies such that a substantially constant spectral slit width is achieved over the whole scanned wavelength range.

5. The grating monochromator of claim 1 wherein said filter means are positioned in the proximity but spaced apart from said plane where said intermediate images are formed.

6. The grating monochromator of claim 2 wherein said filter means are positioned in the proximity but spaced apart from said plane where said intermediate images are formed.

7. The grating monochromator of claim 3 wherein said filter means are positioned in the proximity but spaced apart from said plane where said intermediate images are formed.

8. The grating monochromator of claim 4 wherein said filter means are positioned in the proximity but spaced apart from said plane where said intermediate images are formed.

* * * * *